United States Patent [19]
Mohandes

[11] Patent Number: 5,528,483
[45] Date of Patent: Jun. 18, 1996

[54] VOLTAGE CONVERTER WITH FREQUENCY SHIFT PROTECTION AGAINST OVERLOAD CURRENT

[75] Inventor: Bijan E. Mohandes, Newbury, United Kingdom

[73] Assignee: Siliconix, Inc., Santa Clara, Calif.

[21] Appl. No.: 295,271

[22] Filed: Aug. 23, 1994

[51] Int. Cl.$^6$ .................................................. H02M 3/335
[52] U.S. Cl. .................................. 363/21; 363/56; 363/97
[58] Field of Search ............................ 363/20, 21, 56, 363/97, 132

[56] References Cited

U.S. PATENT DOCUMENTS

| | | | |
|---|---|---|---|
| 5,055,991 | 10/1991 | Carroll et al. | 363/56 |
| 5,377,091 | 12/1994 | Faulk | 363/21 |

FOREIGN PATENT DOCUMENTS

| | | | |
|---|---|---|---|
| 0498917A1 | 8/1992 | European Pat. Off. | H02M 3/335 |
| 3627858A1 | 2/1988 | Germany | H02M 3/28 |
| 3912849A1 | 11/1989 | Germany | H02M 3/28 |
| 4118918A1 | 12/1992 | Germany | H02M 3/28 |
| 59-204468 | 11/1984 | Japan | H02M 3/335 |

OTHER PUBLICATIONS

"High–Frequency DC-to-DC Converter, Design Guide—Oct. 1993," Siliconix Telefunken, TEMIC, PDS–300–9310, Sep. 14, 1993.

Primary Examiner—Peter S. Wong
Assistant Examiner—Adolf Berhane
Attorney, Agent, or Firm—Skjerven, Morrill, MacPherson, Franklin & Friel; David T. Millers

[57] ABSTRACT

A voltage converter has a control circuit that generates a PWM voltage from a DC input voltage, a housekeeping coil and a first voltage rectifier-filter which supply power to the control circuit from an induced voltage in the housekeeping coil, and a second voltage rectifier coupled to the housekeeping coil to rectify flyback (or reset) voltages in the housekeeping coil. The rectified flyback voltage controls the frequency of the PWM voltage generated by the control circuit. During an overload, the control circuit reduces the duty cycle of the PWM voltage. In response, the magnitude of the rectified flyback voltage falls which causes the frequency of the PWM voltage to be reduced. The first and second voltage rectifiers may be coupled to different taps of the housekeeping coil, so that both voltage rectifiers provide positive voltages relative to a ground tap even though the two voltage rectifiers rectify pulses of opposite polarity on the secondary coil. In an alternative embodiment, a flyback voltage in a secondary coil other than a housekeeping coil is rectified to control the PWM frequency.

13 Claims, 6 Drawing Sheets

VOLTAGE CONVERTER WITH FREQUENCY SHIFT PROTECTION AGAINST OVERLOAD CURRENT

BACKGROUND OF THE INVENTION

1. Field of the Invention

This invention relates to PWM (pulse width modulated) switched mode power supplies and voltage converters with protection against overload currents.

2. Description of Related Art

Figure 1:
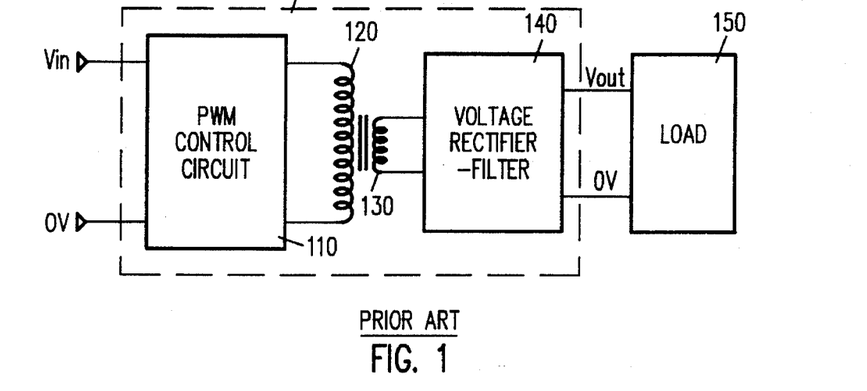
FIG. 1 shows a block diagram of a prior art voltage converter and a connected load.
Figure 2:
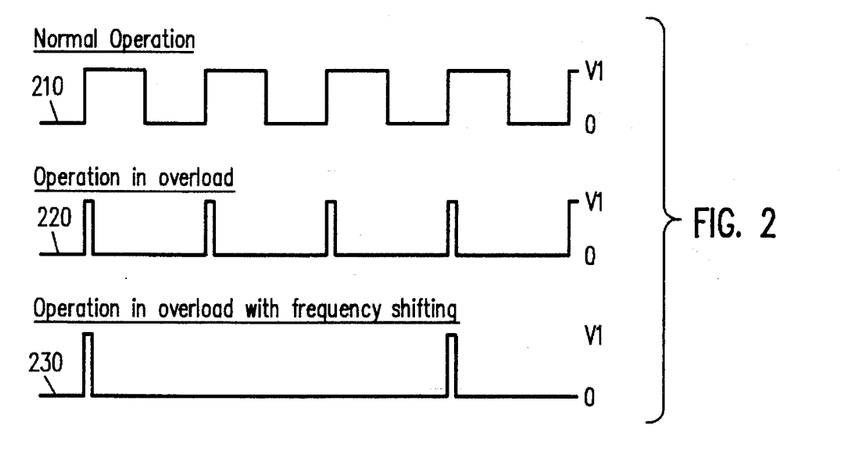
FIG. 2 shows waveforms of pulse width modulated voltages generated in voltage converters in accordance with an embodiment of this invention.

Some voltage converters use pulse width modulation and a transformer to convert one DC voltage to another DC voltage. FIG. 1 shows a block diagram of a voltage converter 100 that converts a DC input voltage Vin at voltage level V1 to a DC output voltage Vout at voltage level V2. A control circuit 110 in voltage converter 100 connects and disconnects input voltage Vin to a primary coil 120 to generate a pulse width modulated (PWM) voltage across primary coil 120. (Voltage 210 in FIG. 2 shows a typical PWM voltage applied to primary coil 120 during normal operation.) The PWM voltage causes primary coil 120 to generate a time dependent magnetic flux which induces an AC voltage in a secondary coil 130. A voltage rectifier and filter 140 rectifies the AC voltage in secondary coil 130 and provides DC output voltage Vout to a load 150.

If load 150 develops a short or otherwise draws too much current, an overload occurs which could damage load 150 and voltage converter 100. Control circuit 110 typically contains an overload sensor and a duty cycle control circuit. The overload sensor senses peak current on an input side of voltage converter 100. The a duty cycle control circuit reduces the duty cycle of the PWM voltage when an overload current is sensed. Voltage 220 in FIG. 2 is an example of a PWM voltage with a reduced duty cycle.

Figure 3:
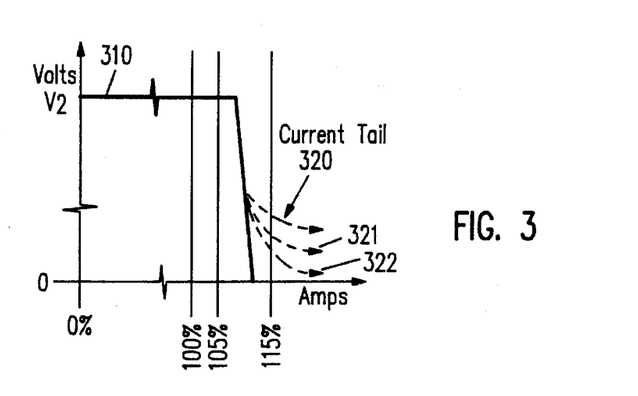
FIG. 3 shows plots of output voltage verses output current for a voltage converter.

FIG. 3 shows plots of output voltage Vout verses output current for a voltage converter such as voltage converter 100 in FIG. 1. Voltage plot 310 illustrates the desired behavior of voltage converter 100. In a range of currents from 0 to 100% of a rated current capacity of voltage converter 100, rectifier and filter 140 supplies output voltage Vout at level V2. When the output current reaches an overload level (in FIG. 3, overload current is between 105% and 115% of the rated current), control circuit 110 reduces the duty cycle of the PWM voltage driving primary coil 120. This reduces the power flow through voltage converter 100, and output voltage Vout drops. Ideally, output voltage Vout falls to zero which cuts off the current in load 150 and prevents circuit damage. In actual voltage converters, a varying PWM voltage applied to primary coil 120, even one with a small duty cycle, causes a non-zero output voltage Vout from rectifier and filter 140 and a non-zero current tail such as current tails 320, 321, or 322 which extend to high currents. In some applications, the current tail can contain sufficient power to damage load 150 and voltage converter 100.

In voltage converter 100, higher frequency PWM voltages permit the use of smaller components such as smaller primary and secondary coils 120 and 130 and smaller capacitors in voltage rectifier and filter 140, thus using higher frequency PWM voltages reduces the size and cost of voltage converter 100. Unfortunately, higher frequency PWM voltages also make reduction of duty cycle more difficult, and if the frequency is too high, the duty cycle cannot be reduced enough to prevent an overload current tail from damaging load 150 or voltage converter 100. Accordingly, a voltage converter is needed which operates at high PWM frequency and which provides a better voltage cutoff to prevent damage caused by overload currents.

SUMMARY OF THE INVENTION

In response to an overload current, voltage converters in accordance with this invention shift a frequency of a PWM voltage generated by a control circuit. A housekeeping coil and a first voltage rectifier provide a supply voltage to the control circuit. A second voltage rectifier coupled to the housekeeping coil rectifies a flyback (or reset) voltage in the housekeeping coil to generate a control signal which controls the frequency of the PWM voltage generated by the control circuit. During an overload, the control circuit reduces the duty cycle of the PWM voltage. This causes the control signal voltage to fall which in turn causes the PWM frequency to be reduced. Reduction of both duty cycle and frequency reduces the power through the voltage converter more than would reduction of duty cycle alone. Additionally, the control signal is from the housekeeping coil on an input side of the voltage converter, thus eliminating the need for opto-couplers, current transformers, or other special circuits for reducing the possibility of shorts between the input side and an output side of the voltage converter. Difficulties involved in using the same overload sensor to control both duty cycle and frequency reduction are eliminated.

One embodiment of the invention includes a voltage converter having a primary coil, a control circuit which asserts a PWM voltage across the primary coil, a secondary coil, and a voltage rectifier coupled to the secondary coil. The voltage rectifier applies a control signal to the control circuit, and when the duty cycle of the PWM voltage falls to a predefined level, the control signal applied to the voltage source causes the control circuit to decrease the frequency of the PWM voltage. Typically, a second voltage rectifier is also coupled to the secondary coil. The second voltage rectifier rectifies voltage pulses of one polarity on the secondary coil, and the first voltage rectifier rectifies voltage pulses of the opposite polarity on the secondary coil. For example, when the secondary coil is a housekeeping coil, the second voltage rectifier supplies power to the control circuit, and the first voltage rectifier rectifies flyback (or reset) pulses. Alternatively, the secondary coil can supply power to an external load on an output side of the voltage converter, and an optocoupler may be coupled between the first voltage rectifier and the control circuit to isolate the input side from output side in the voltage converter.

In another embodiment, the first and second voltage rectifiers are coupled to different taps in the secondary coil, so that both voltage rectifiers provide positive voltages relative to a ground tap even though the two voltage rectifiers rectify induced voltage pulses of opposite polarity on the secondary coil.

BRIEF DESCRIPTION OF THE DRAWINGS

Use of the same reference symbols in different figures indicated similar or identical items.

DETAILED DESCRIPTION OF THE PREFERRED EMBODIMENTS

Figure 4:
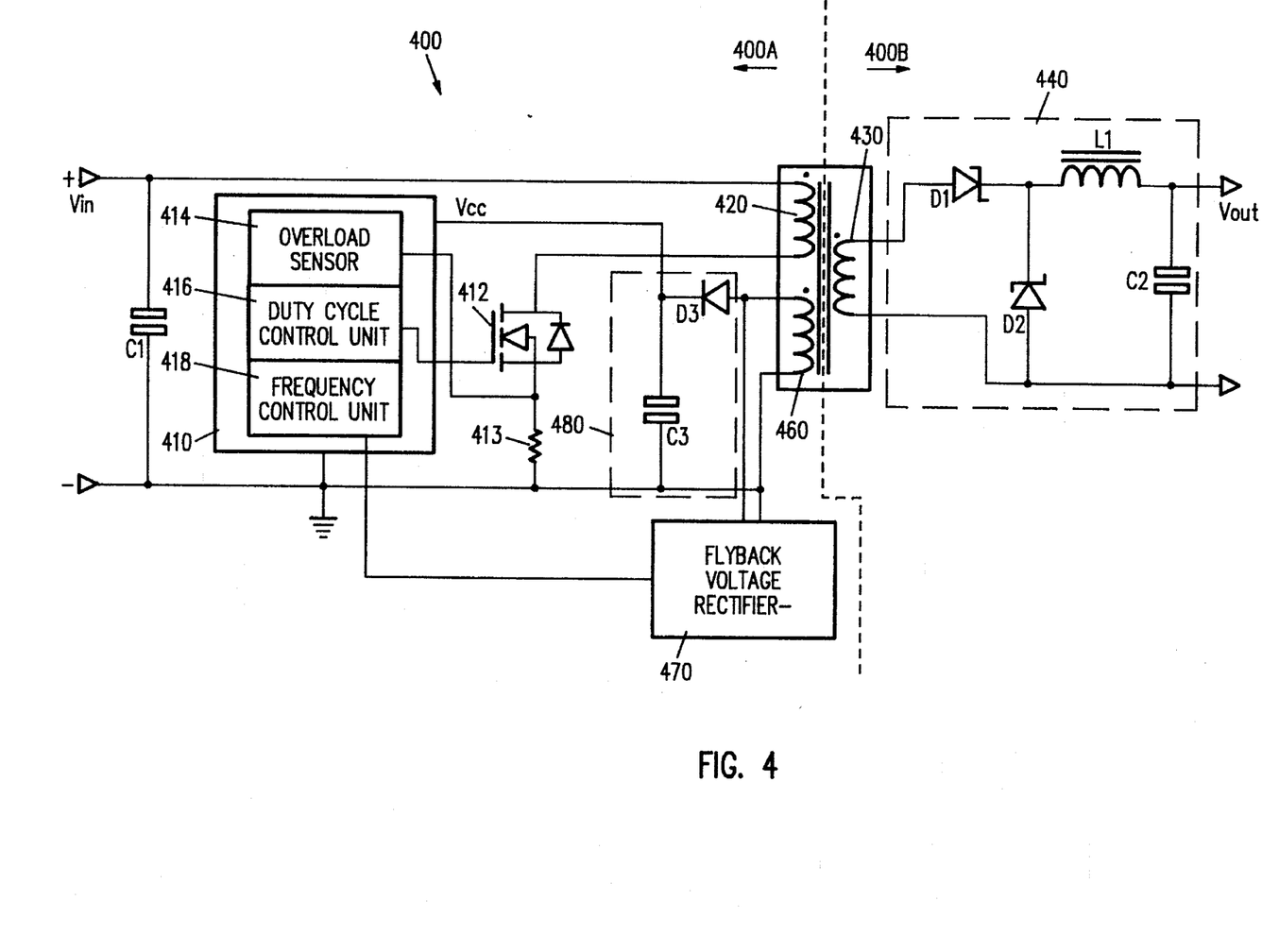
FIG. 4 shows a block diagram of a voltage converter in accordance an embodiment of this invention.

FIG. 4 shows a voltage converter 400 in accordance with an embodiment of this invention. Voltage converter 400 employs a voltage rectifier and filter 470 (also referred to herein as flyback voltage rectifier 470) coupled to a secondary coil 460 (also referred to herein as housekeeping coil 460). Flyback voltage rectifier 470 rectifies negative or flyback voltages on housekeeping coil 460 and provides a control signal to a control circuit 410 which controls the frequency of a pulse width modulated (PWM) voltage applied to a primary coil 420. During an overload current, control circuit 410 reduces the duty cycle of the PWM voltage applied to primary coil 420. The reduction in duty cycle reduces the magnitude of flyback voltages in secondary coil 460, and the magnitude of the control signal supplied by flyback voltage rectifier 470 decreases. The changed control signal causes control circuit 410 to reduce the frequency of the PWM voltage. Reducing frequency in response to a reduced duty cycle reduces the power flow through voltage converter 400 more than would a reduction of the duty cycle alone. Voltage converter 400 therefore provides a safer shutdown during an overload than would a voltage convert that only reduces the duty cycle of the PWM voltage.

Voltage converter 400 converts a DC input voltage Vin at voltage level V1 to a DC output voltage Vout at voltage level V2 by generating the PWM voltage in primary coil 420. Primary coil 420 has a first terminal coupled to voltage Vin, and a second terminal coupled through a transistor 412 and a resistor 413 to ground. A capacitor C1 coupled from input voltage Vin to ground smooths input voltage Vin, reduces the effects of power surges and drops, and ensures that the peak voltage of the PWM voltage equals voltage V1. A typical input voltage V1 may be for example 48 volts, but embodiments can be implemented for any input voltage.

Control circuit 410 generates the PWM voltage across primary coil 420 by switching transistor 412 on and off. Transistor 412 is a discrete power transistor capable handling a rated current of voltage converter 400 at the input voltage. However, in an alternative embodiment transistor 412 may be integrated into control circuit 410.

The PWM voltage across primary coil 420 causes a varying magnetic flux which induces AC voltages in a secondary coil 430 and housekeeping coil 460. Typically, a core made of a magnetic material such as ferrite is disposed through primary coil 420 and secondary coils 430 and 460. The core is typically insulated to prevent shorts between primary coil 420, secondary coil 430, and housekeeping coil 460. The peaks of the AC voltages in secondary coils 430 and 460 depend in a well known manner on the peak voltage of the PWM voltage, the duty cycle of the PWM voltage, and the number of windings in primary coil 420 and in secondary coils 430 and 460. For example, a typical embodiment can convert a 48 volt input voltage Vin to a 5 volt output voltage Vout.

A voltage rectifier and filter 440 provides DC output voltage Vout. Output voltage Vout is generally supplied to a load (not shown). Rectifier and filter 440 contains a Schottky diode D1 which rectifies the AC voltage in secondary coil 430 to provide to an inductor L1 a series of voltage pulses of a first polarity. The voltage pulses of the first polarity occur during times when voltage Vin is applied to primary coil 420 and are referred to herein as being positive to define a sign convention. Inductor L1 and a capacitor C2 form an LC filter which filters the positive pulses so that the output voltage Vout is nearly constant. Rectifying and filtering AC voltages is well known in the art, and rectifier and filter 440 is just one example of many rectifier-filter circuits which may be employed.

An induced voltage of the opposite polarity (negative voltage pulses) are generated during times when transistor 412 is off. During the negative voltage pulses, diode D1 becomes reverse biased, and current through coil 430 dies quickly. Magnetic flux in coils 420, 430, and 460 is reset to zero before the next positive pulse. Current freewheels through inductor L1, capacitor C2, and diode D2 to maintain voltage Vout while diode D1 is reversed biased.

Figure 5:
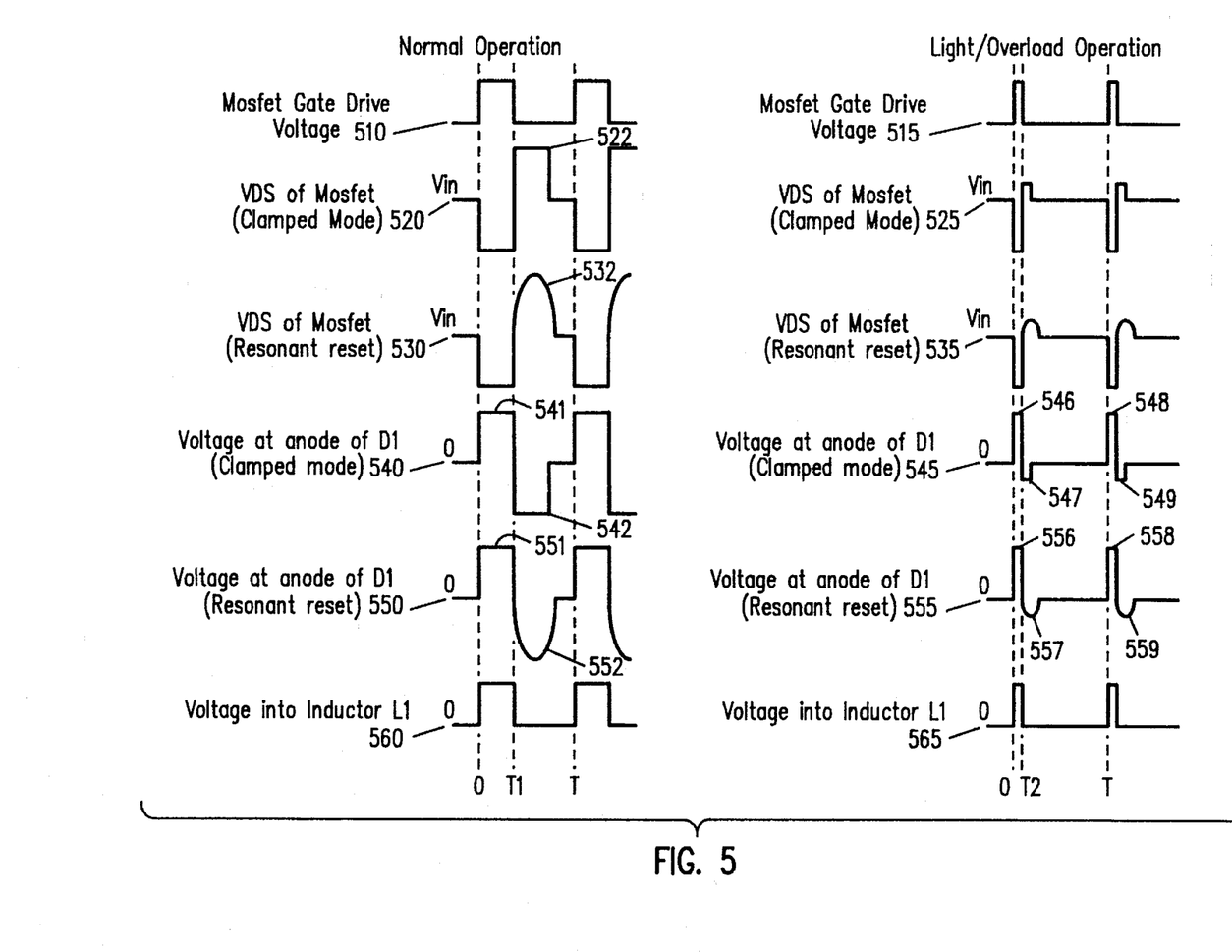
FIG. 5 shows waveforms of voltages in a voltage converter in clamped forward and resonant forward configurations in normal and overload operation.

FIG. 5 shows examples of voltage waveforms in voltage converters under normal operation or reduced duty cycle operation. Waveforms 530, 535, 550, and 555 result in a voltage converter that uses resonant reset mode to control negative or flyback voltages. For resonant reset, actual and parasitic circuit elements in the voltage converter are tuned to resonate at the appropriate frequency to smooth the flyback voltages. Waveforms 520 and 540 are for clamped mode operation in a voltage converter that contains a clamp circuit (not shown) which clamps flyback voltages. Resonant reset mode and clamped mode operation of voltage converters are well known in the art.

In a voltage converter such as voltage converter 400 of FIG. 4, waveform 510 is a PWM gate voltage which turns transistor 412 on and off. Waveform 510 has a period T and is high to turn on transistor 412 for a time T1 each period. The duty cycle of waveform 510 is T1/T, the fraction or percentage of the time transistor 412 is high. Transistor 412 applies to primary coil 420 a PWM voltage having the same period and duty cycle as waveform 510, and the PWM voltage applied to primary coil 420 induces a counter EMF in primary coil 420 which changes the drain-source voltage VDS across transistor 412.

Waveform 520 and 530 shows resulting drain-source voltages VDS across transistor 412 for clamped mode and resonant reset mode respectively. Voltage VDS is the difference between voltage Vin and the induced voltage in primary coil 420. At time 0, transistor 412 turns on current begins flowing through primary coil 420. An induced voltage in primary coil 420 opposes the increasing in current during the time interval from time 0 to time T1. From time T1 to time T, the PWM voltage applied to primary coil 420 is off, and current falls in primary coil 420. The falling current induces a voltage pulse 522 or 532 in primary coil 420. Voltage pulses 522 and 532 have a shape that is determined by the reset mode operation of the voltage converter. For waveform 530, parasitic circuit elements in primary coil 420 and transistor 412 are tuned to smooth voltage pulse 532. For waveform 520, voltage pulse 522 is clamped and does not exceed a fixed voltage. Voltage VDS equals voltage Vin when the current in primary coil 420 stops changing and the induced voltage in primary coil 420 falls to zero.

Changing current in primary coil 420 causes a changing magnetic field which induces voltages in secondary coils 430 and 460. Waveforms 540 and 550 are examples of voltages induced in secondary coil 430 by the PWM voltage 510 during a clamped reset and resonant reset operation respectively. Between times 0 and T1, PWM voltage 510 is high, and the current through primary coil 420 increases at a rate which induces in secondary coil 430 a positive voltage pulse 541 or 551. Positive voltage pulses 541 and 551 forward bias diode D1. Current through diode D1 is limited by inductor L1, and the inductance of inductor L1 controls the peak-to-peak ripple in output voltage Vout.

During the time between T1 and T, PWM voltage 510 drops to zero, and decreasing current in primary coil 420 induces a negative voltage pulse or 542 or 552 in secondary coil 430. Negative voltage pulse 542 has a minimum (most negative) voltage limited by a clamp circuit. Negative voltage pulse 552 has a minimum limited by the resonant frequency of the voltage converter 400. Negative voltage such as pulse 542 or 552 is referred to herein as a flyback voltage or a reset voltage. The flyback voltage reverse biases diode D1. Waveform 560 shows the voltage to inductor L1 which comprises only positive voltage pulses. Inductor L1 and capacitor C2 in voltage rectifier and filter 440 smooth the fluctuations in waveform 560 and maintain output voltage Vout at about voltage level V2.

PWM voltage 515 has a reduced duty cycle and is produced, for example, in response to an overload current or a light load current. Waveforms 545 and 555 represent induced voltages in secondary coil 430 during clamped and resonant reset operation respectively. Induced voltages 545 and 555 have positive voltage pulses 546, 548, 566, and 568 of smaller duration than positive pulses 541 and 551 of induced voltages 540 and 550. Accordingly, waveform 565 applied to inductor L1 has a smaller time integrated voltage, and voltage rectifier and filter 440 can not maintain a high output voltage V2 at high currents. Additionally, the smaller time integrated voltage causes waveforms 545 and 555 to have flyback voltage pulses 547, 549, 557, and 559 of shorter duration and smaller amplitude than flyback voltage pulses 542 and 552 of waveforms 540 and 550.

Voltages similar to voltages 540, 545, 550, and 555 are induced in housekeeping coil 460 in response to PWM voltages across primary coil 420. A voltage rectifier and filter 480 rectifies and filters positive voltage pulses induced in housekeeping coil 460 and provides a supply voltage Vcc to operate control circuit 410. Supply voltage Vcc being taken from housekeeping coil 460 and voltage rectifier and filter 480 instead of from secondary coil 430 and voltage rectifier and filter 440 maintains isolation which is usually required between input and output sides 400A and 400B of voltage converter 400.

Control circuit 410 contains an overload sensor 414, a duty cycle control unit 416, and a frequency control unit 418. Overload sensor 414 determines if there is an overload current in voltage converter 400 and/or an attached load by comparing the voltage drop across resistor 413 to a reference voltage. Many alternative types of overload sensors are known in the art and may be employed in control circuit 410. For example, in heavy current applications, use of a current transformer could sense the peak current and reduce power dissipation inherent in resistor 413.

In response to a sensed current overload, duty cycle control unit 416 reduces the duty cycle of the PWM voltage. Circuits for controlling the duty cycle of PWM voltages are well known in the art. Duty cycle control unit 416 has a minimum non-zero duty cycle which is inherent to propagation time delays in control circuit 410 and charging and discharging time of the gate of transistor 412. (A non-zero duty cycle is required to induce a voltage in housekeeping coil 460 and provide supply voltage Vcc to control circuit 410.) Voltage 515 in FIG. 5 is an example of a reduced duty cycle PWM voltage. At higher PWM frequencies, the inherent delays can be a significant fraction of the period of the PWM voltage so that even at the minimum non-zero duty cycle, sufficient power to damage an attached load may still flow through converter 400.

Flyback voltage rectifier 470 rectifies and filters the flyback voltage (negative voltage pulses) in housekeeping coil 460 to provide a control signal for frequency control unit 418. The magnitude of the control signal is proportional to the peak of the flyback voltage in housekeeping coil 460. Accordingly, the magnitude of the control signal drops when the duty cycle of the PWM voltage decreases. The drop in the control signal causes frequency control unit 418 to decrease the frequency of the PWM voltage. Voltage 230 in FIG. 2 shows an example of a PWM voltage with reduced frequency and duty cycle. The combination of the reduced duty cycle and the reduced frequency decreases the power drawn through voltage converter 400, to a safe level.

If an overload condition is removed, voltage converter 400 can undergo a safe power-up. For example, if overload sensor 414 senses that peak current through transistor 412 is at a safe level, the PWM voltage can be returned to the normal operation duty cycle and frequency. During such a power-up, currents are typically larger than the steady state because capacitors in voltage converter 400 such as capacitors C2 and C3 are being charged. Duty cycle control unit 416 gradually increases the duty cycle in accordance with a current mode or current programming control technique, well known in the art. In addition, "soft start" a technique well known in the art, can be used in conjunction with a recovery from short circuit to normal operation.

During light load currents, decreasing frequency may increases efficiency. In typical operation, rectifier-filter 440 provides a time averaged output current with a magnitude that depends on an attached load. The output current has a ripple or time variation that is inherent to rectifier-filter 440 and depends on the frequency and duty cycle of the PWM voltage. If the average output current is small enough, the ripple in the output current can be larger than the average output current, and the output current is discontinuous. Control circuit 410 senses low peak currents through transistor 412, and when current through transistor 412 indicates the output current is below a minimum threshold, control circuit 410 reduces the duty cycle of the PWM voltage. The reduced duty cycle causes a reduction in PWM frequency in the same manner as disclosed above in regard to current overload. Voltage converter 400 becomes more efficient because some of the power losses such as the power used to turn transistor 412 on and off are frequency dependent. Reducing frequency for low currents reduces the frequency dependent power losses.

Figure 6:
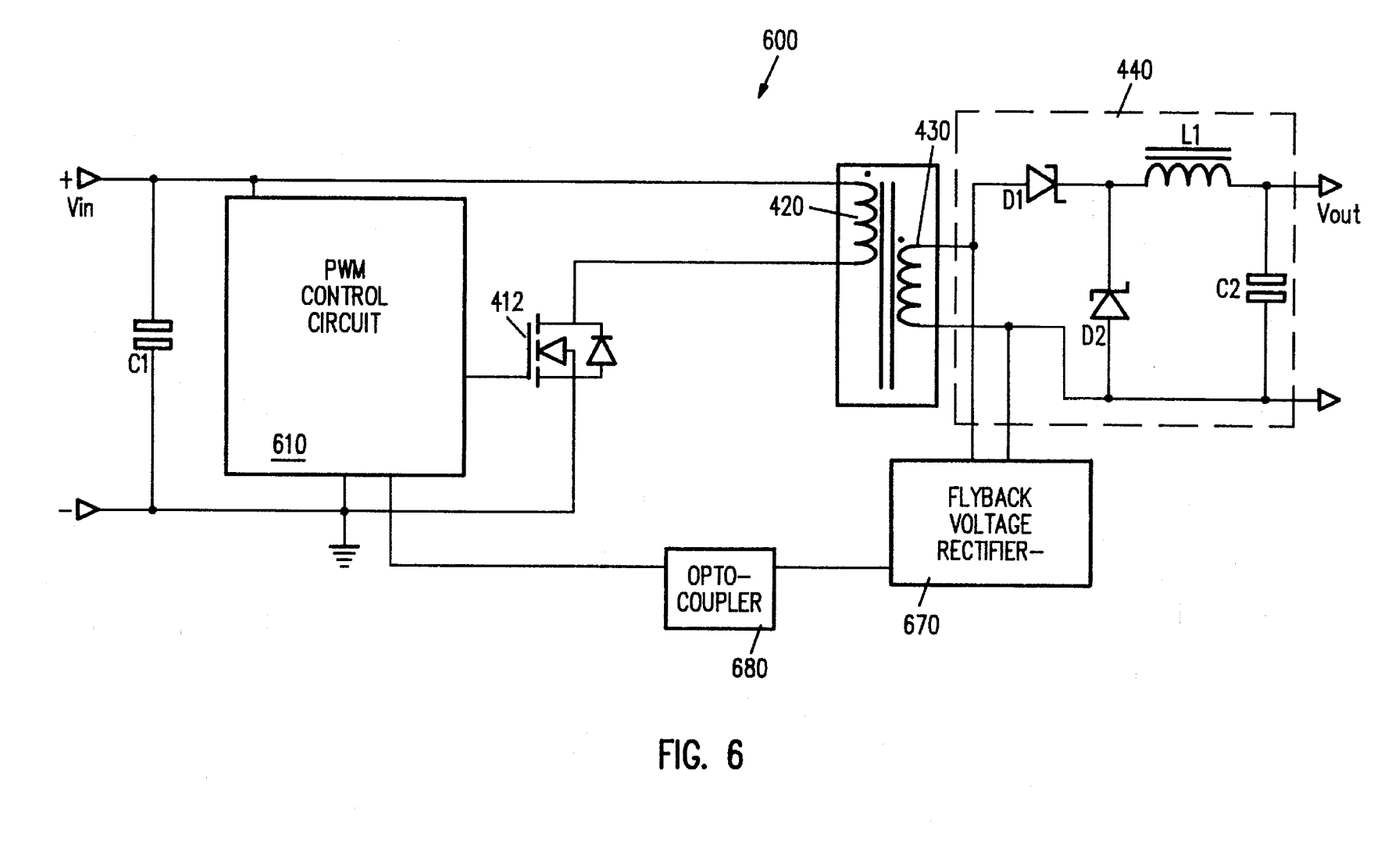
FIG. 6 shows a block diagram of a voltage converter in accordance another embodiment of this invention.

FIG. 6 shows a voltage converter 600 in accordance with the present invention. The embodiment of FIG. 6 contains many of the same elements as the embodiment of FIG. 4, and the above description of those elements is applicable here. The embodiment of FIG. 6 differs from the embodiment of FIG. 4 primarily in that no housekeeping coil is provided. Control circuit 610 in FIG. 6 serves the same function as control circuit 410 in FIG. 4, but control circuit 610 draws power from input voltage Vin. A flyback voltage rectifier 670 is attached to secondary coil 430 in FIG. 6, rather than to housekeeping coil 460 as in FIG. 4. Flyback voltage rectifier 670 otherwise operates in a manner similar to flyback voltage rectifier 470 disclosed above.

An optional opto-coupler 680 is connected between flyback voltage rectifier 670 and control circuit 610 to provide the control signal to control circuit 610. opto-couplers are well known in the art and convert an input voltage to a light signal which is then converted to an output voltage. Opto-coupler 680 permits the control signal to be transmitted across the isolation barrier between input and output sides of voltage converter 600 but prevents shorts from the input side to the output side.

The embodiment of FIG. 6 has fewer components than the embodiment of FIG. 4 but has several disadvantages. The disadvantages of the embodiment of FIG. 6 are the increased cost of integrated circuitry which operates at voltage Vin, the decrease in control of power supply voltage used by control circuit 610, and the expense of opto-coupler 680 to prevent shorts from the input side to the output side of voltage converter 600.

Figure 7:
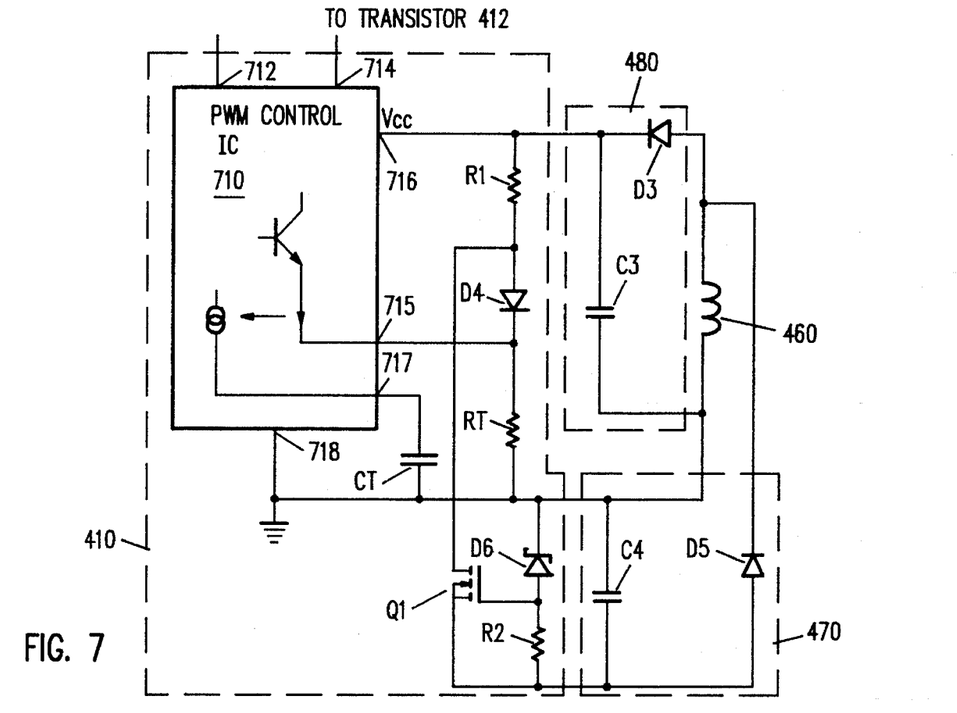
FIG. 7 shows a circuit diagram of an embodiment of a flyback voltage rectifier and circuitry for reducing the frequency of a PWM voltage in a voltage converter during a current overload.

FIG. 7 shows a circuit 700 which controls the frequency of a PWM voltage in accordance with yet another embodiment of this invention. Circuit 700 contains a commercially available control integrated Circuit (IC) 710 which is an Si9114 available from Siliconix, Inc. of Santa Clara, Calif. Control IC 710 has a supply voltage terminal 716, a ground terminal 718, a terminal 714 for connecting to turn a power transistor on and off and pulse width modulate the input voltage Vin, and one or more terminals 712 for sensing overloads. Terminals 715 and 717 respectively connect to a resistor RT and a capacitor CT. The frequency of the PWM voltage depends on the time to charge (and discharge) capacitor CT to a predefined voltage level. A current mirror inside control IC 710 causes a current which charges capacitor CT to mirror a current through terminal 715, so that changing the effective resistance of resistor RT changes both the time to charge capacitor CT and the frequency of the PWM voltage.

An induced voltage in housekeeping coil 460 has positive pulses and negative pulses such as positive pulses 551 and 556 and negative pulses 552 and 557 of waveform 550 in FIG. 5. The positive pulses forward bias a diode D3 and charge a capacitor C3 to provide supply voltage Vcc to control IC 710. Supply voltage Vcc is also connected through a resistor R1 and a diode D4 to resistor RT.

The negative (or flyback) pulses induced in housekeeping coil 460 forward bias a diode D5 and charge a capacitor C4 to provide a negative control signal. During normal operation, the negative pulses induced in housekeeping coil 460 are of sufficient magnitude (typically 20 to 30 volts) to cause a voltage breakdown of a zener diode D6. This causes a current flow through a resistor R2 and turns on a transistor Q1. Transistor Q1 connects the anode of diode D4 to the negative control signal and reverse biases diode D4. Accordingly, current does not flow through diode D4 during normal operation, and resistor RT controls the current through terminal 715.

During an overload, the duty cycle of the PWM voltage applied to the primary coil drops, and the negative voltage pulses induced in housekeeping coil 460 are insufficient to cause a breakdown of zener diode D6. Transistor Q1 is off, and diode D4 is forward biased by voltage Vcc. A current flows from voltage Vcc through resistor R1, diode D4, and resistor RT. This changes the voltage on terminal 715 and reduces the current through terminals 715 and 717 which in turn reduces the charging rate of capacitor CT and the frequency of the PWM voltage.

In an exemplary embodiment, a voltage converter containing the circuitry as shown in FIG. 7 has an input voltage Vin of 48 volts. The ratio of the number of windings in a primary coil to the number of windings in housekeeping coil 460 is 3-to-1. Control integrated circuit (IC) 710 is a Si9114, described above. Resistors R1, R2, and RT have resistances 120 k$\Omega$, 47 k$\Omega$, and 68 k$\Omega$ respectively. Capacitors C3, C4, and CT have capacitances of 1 μf, 1 nf, and 68 pf, and zener diode D4 has a breakdown voltage of 20 volts. During normal operations, the circuit operates with a PWM voltage having a duty cycle of about 50% and a frequency of 750 kHz. During an overload, the circuit operates with a PWM voltage having a duty cycle of less than about 5% and a frequency of 120 kHz.

Although circuit 700 as disclosed contains discrete elements attached to control IC 710, any level of integration may be employed. For example, diodes D4 and D6, resistors R1 and R2, and transistor Q1 may be incorporated into control IC 710. In such embodiment, the control IC has an additional terminal, not shown on control IC 710, for the negative control signal from flyback rectifier 470. However, using negative voltages in ICs typically requires special isolation and makes the ICS larger and more expensive.

Figure 8:
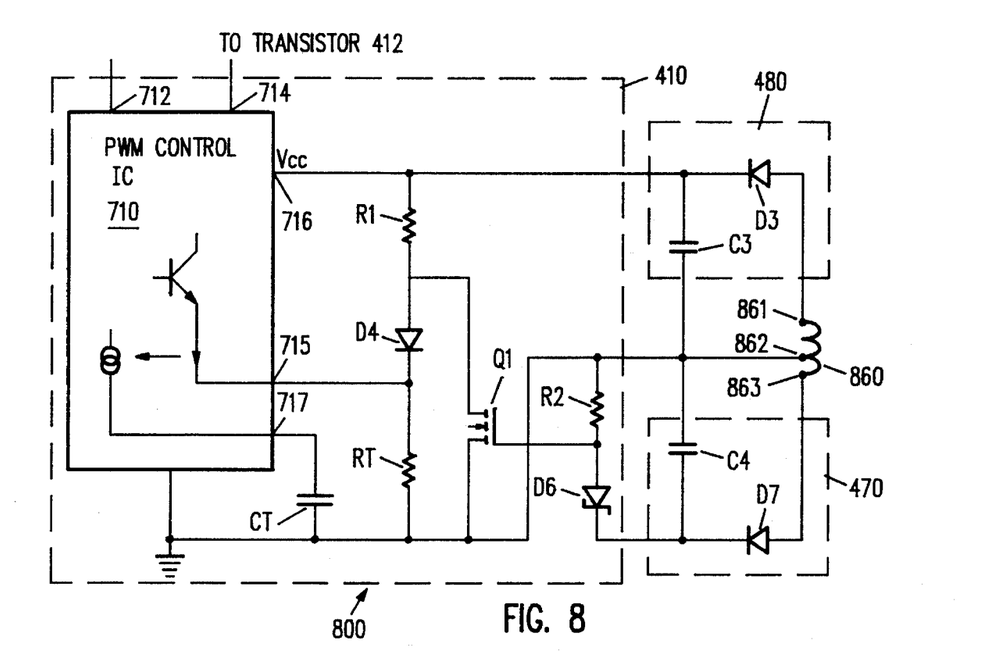
FIG. 8 shows a circuit diagram of an embodiment of a flyback voltage rectifier which provides a positive control signal and circuitry for reducing frequency in response to the control signal.

FIG. 8 shows a circuit 800 which controls the frequency of a PWM voltage in accordance with yet another embodiment of this invention. In FIG. 8, a ground terminal (or tap) 862 is provided between end terminals 861 and 863 of a housekeeping coil 860 so that a rectified flyback voltage is positive relative to the ground used in control IC 710. When an induced voltage in housekeeping coil 860 has a polarity such that terminal 861 is at a higher potential than terminal 863, diode D3 conducts and the voltage difference between the voltage at terminal 861 and the voltage at terminal 862 (ground) charges capacitor C3. Diode D7 being connected to terminal 863 is at a lower potential than terminal 862 (ground) and therefore does not conduct when terminal 861 is at a higher potential than terminal 863.

During flyback voltage pulses, terminal 863 is at a higher potential than terminal 861. Diode D3 does not conduct, and stored charge on capacitor C3 provides supply voltage Vcc to control circuit 710. However, since terminal 863 is at a higher voltage than terminal 862, diode D7 conducts and capacitor C4 is charged by the positive voltage difference between terminal 863 and 862 (ground). The rectified flyback voltage controls the frequency of the PWM voltage in substantially the manner described above in regard to FIG. 7.

The embodiment of FIG. 8 has an advantage over the embodiment of FIG. 7 when elements such as diodes D4 and D6, resistors R1 and R2, and transistor Q1 are incorporated into control IC 710. In the embodiment of FIG. 8, the control signal is positive relative to ground, and special isolation techniques are not required. This allows an integrated circuit to be smaller and cheaper.

Figure 9:
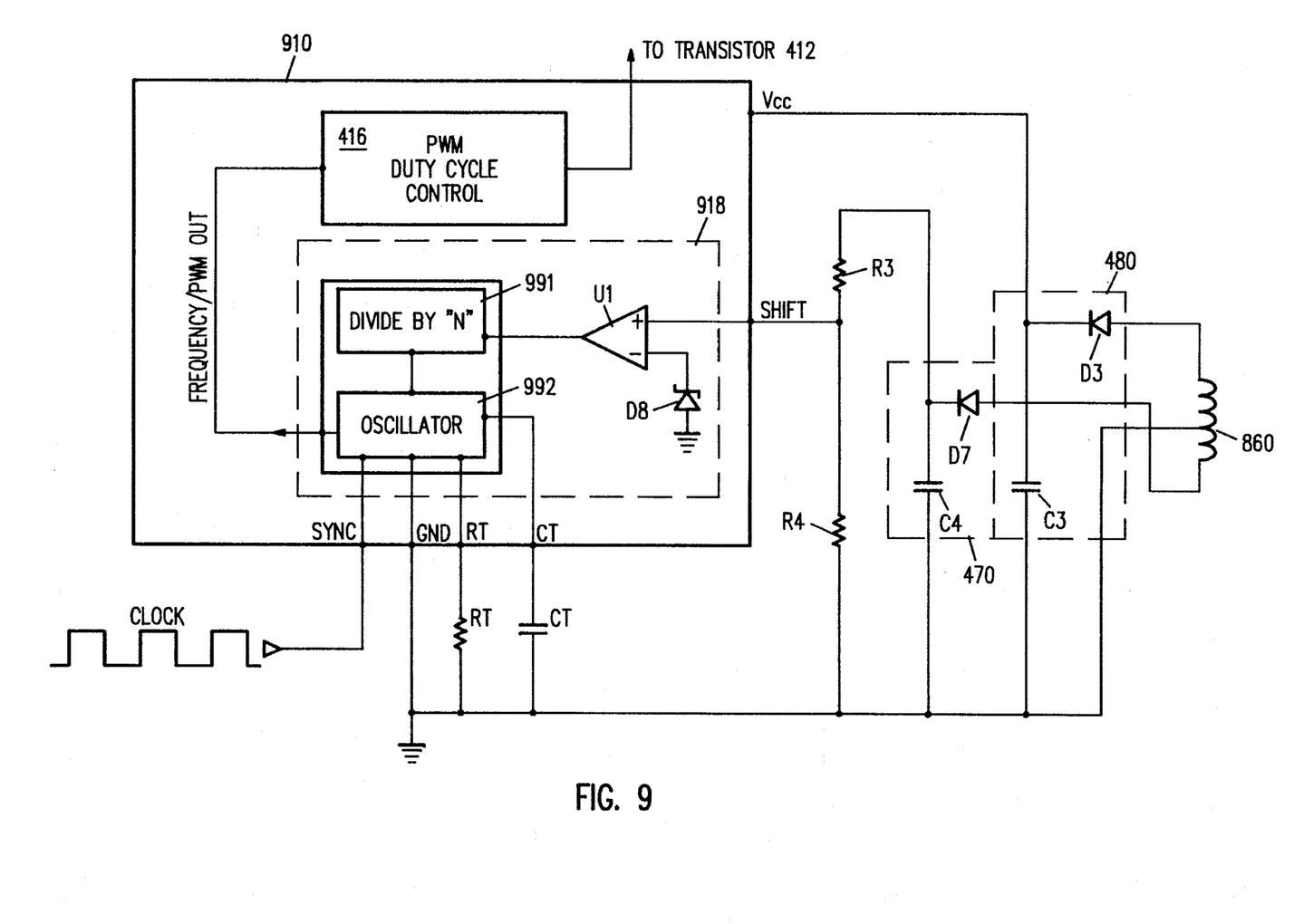
FIG. 9 shows a block diagram of a portion of voltage converter employing a digital frequency divider in accordance another embodiment of this invention.

FIG. 9 illustrates another technique for controlling the PWM frequency. In the embodiment of FIG. 9, a PWM control circuit 910 contains a digital frequency divider 991 having an enable pin controlled by a control signal from flyback voltage rectifier 470. When the control signal from flyback voltage rectifier 470 falls below a cut-off voltage, digital frequency divider 991 is enabled and reduces the frequency of the PWM voltage to the gate of transistor 412. During an overload, frequency divider 991 reduces the PWM frequency output from an oscillator 992, by a fixed integer factor N such as four, eight, or sixteen. This keeps the PWM voltage synchronized with a system clock signal CLOCK, and reduces interference that may be generated in a voltage converter by an overload PWM frequency that is fractionally different the normal operation PWM frequency.

The cut-off voltage can be set to a desired value by an appropriate selection of resistors R3 and R4 and a reference D8. Resistors R3 and R4 form a voltage divider which controls the input voltage on a positive input terminal of a comparator U1, and comparator U1 controls the voltage which enables or disable frequency divider 991. Many alternative methods of providing the control signal from flyback voltage rectifier 470 to enable frequency divider 991 could be employed.

Although the present invention has been described with reference to particular embodiments, the description is only an example of the invention's application and should not be taken as a limitation. Various other combinations and adaptations of the features disclosed herein will be apparent in view of this disclosure.

I claim:

1. A voltage converter comprising:

a primary coil;

a control circuit which asserts a pulse width modulated voltage across the primary coil, the pulse width modulated voltage having a frequency which depends on a control signal delivered to the control circuit;

a secondary coil positioned so that a changing magnetic flux from the primary coil induces a voltage in the secondary coil; and a first voltage rectifier coupled to the secondary coil and operably connected to apply the control signal to the control circuit, wherein in response to a duty cycle of the pulse width modulated voltage falling to a first level, the control signal applied to the control circuit causes a decrease in the frequency of the pulse width modulated voltage.

2. The voltage converter of claim 1, further comprising a second voltage rectifier coupled to the secondary coil, wherein the first voltage rectifier rectifies voltage of a first polarity on the secondary coil, and the second voltage rectifier rectifies voltage of a second polarity, opposite the first polarity, on the secondary coil.

3. The voltage converter of claim 2, wherein the secondary coil is a housekeeping coil, and the second voltage rectifier supplies power to the control circuit.

4. The voltage converter of claim 2, wherein the second voltage rectifier supplies power to an external load.

5. The voltage converter of claim 4, further comprising an opto-coupler coupled between the first voltage rectifier and the control circuit.

6. The voltage converter of claim 2, wherein the secondary coil further comprises:

a first terminal at a first end of the secondary coil;

a second terminal at a second end of the secondary coil; and a third terminal attached to the secondary coil between the first and second terminals, wherein the first voltage rectifier is coupled to the second and third terminals and the second voltage rectifier is coupled to the first and the third terminals.

7. A method for controlling current in a voltage converter, comprising:

applying a pulse width modulated voltage to a primary coil to induce an AC voltage in a secondary coil;

rectifying pulses of a first polarity in the AC voltage to generate a first DC voltage;

detecting pulses of a second polarity in the AC voltage; and in response to a voltage level of the pulses of the second polarity reaching a predetermined level, reducing the frequency of the pulse width modulated voltage.

8. The method of claim 7, wherein applying the pulse width modulated voltage comprises applying a second DC input voltage to a control circuit which alternately connects and disconnects the second DC input voltage to the primary coil.

9. The method of claim 8, further comprising providing the first DC voltage as a supply voltage for the control circuit.

10. The method of claim 8, wherein detecting pulses of the second polarity comprises:

rectifying the pulses of the second polarity to generate a third DC voltage; and applying the third DC voltage to the control circuit, wherein the control circuit changes the frequency of the pulse width modulated voltage in response to the third DC voltage reaching the predetermined level.

11. The method of claim 7, wherein detecting pulses of the second polarity comprises rectifying the pulses of the second polarity to generate a second DC voltage.

12. A voltage converter comprising:

a primary coil;

a control circuit which asserts a pulse width modulated voltage across the primary coil, the pulse width modulated voltage having a frequency which depends on a control signal delivered to the control circuit;

a secondary coil positioned so that a changing magnetic flux from the primary coil induces an AC voltage in the secondary coil;

a first voltage rectifier operably coupled to the secondary coil and the control circuit, the first voltage rectifier rectifying pulses of a first polarity in the AC voltage to provide a supply voltage to the control circuit; and a second voltage rectifier operably coupled to the secondary coil and the control circuit, the second voltage rectifier rectifying pulses of a second polarity in the AC voltage to provide the control signal to the control circuit.

13. The voltage converter of claim 12, wherein in response to a duty cycle of the pulse width modulated voltage falling to a first level, the second voltage rectifier provides the control signal at a level voltage which causes the control circuit to decrease the frequency of the pulse width modulated voltage.

\* \* \* \* \*